United States Patent [19]
Leonard

[11] Patent Number: 6,085,171
[45] Date of Patent: Jul. 4, 2000

[54] ORDER ENTRY SYSTEM FOR CHANGING COMMUNICATION SERVICE

[75] Inventor: Timothy J. Leonard, McKinney, Tex.

[73] Assignee: Excel Communications, Inc., Dallas, Tex.

[21] Appl. No.: 09/245,786

[22] Filed: Feb. 5, 1999

[51] Int. Cl.[7] .................................................. G06F 17/60
[52] U.S. Cl. .............................. 705/26; 705/44; 705/34; 705/27; 705/39; 379/114; 379/111; 235/375
[58] Field of Search ................................. 379/111, 114; 705/26, 44, 27, 34, 39; 382/119; 380/23, 277

[56] References Cited

U.S. PATENT DOCUMENTS

| | | | |
|---|---|---|---|
| 5,333,184 | 7/1994 | Doherty et al. | 379/115 |
| 5,355,411 | 10/1994 | MacDonald | 380/23 |
| 5,694,551 | 12/1997 | Doyle et al. | 395/226 |
| 5,701,419 | 12/1997 | McConnell | 395/227 |
| 5,708,780 | 1/1998 | Levergood et al. | 395/200.12 |
| 5,839,117 | 11/1998 | Cameron et al. | 705/27 |

OTHER PUBLICATIONS

Johnson Julie, ANI, pp. 1–4, Apr. 1989.
Theofanos, Mary F, RMQ, pp. 1–7, Apr. 1994.
Ann Saccomano, Skyway Freight, pp. 1–3, Apr. 1996.
Wadsworth Kent Hansen, Technology Tools, pp. 1–5, Nov. 1997.
Kathleen Cholewka, "Allegiance, Bell Atlantic Map E–Bond Futures," *ZD, Inc.*, http://www.zdnet.com at Internet, Jan. 27, 1999, 2 pages.

*Primary Examiner*—James P. Trammell
*Assistant Examiner*—Mussie K. Tesfamariam
*Attorney, Agent, or Firm*—Baker Botts, L.L.P.

[57] ABSTRACT

A system for processing an order to change communication service includes a client that receives order data and an authorization image associated with a customer that desires to change communication service. The system also includes a server coupled to the client using a communication network. The server receives the order data and the authorization image from the client, generates a service request using the order data, and initiates communication of the service request to a communication service provider of the customer to change communication service.

107 Claims, 12 Drawing Sheets

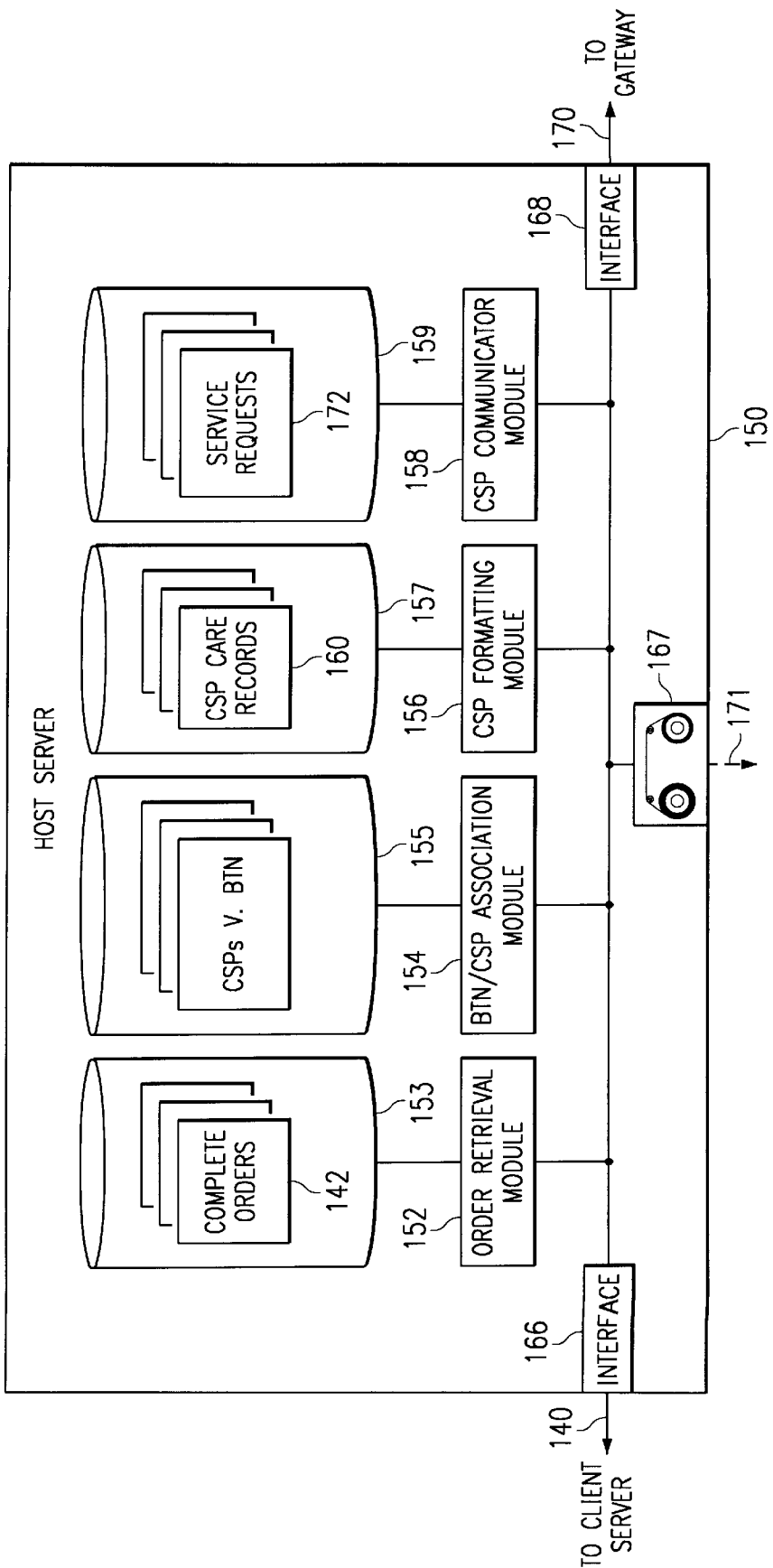

FIG. 8

OrderNet Remote Internet Order Entry

Steps:                    Submission ID 167          (214)222-6543

Billing Address

- Billing Telephone Number
- Billing Address
- Service Location
- Credit Information
- Other Credit Information
- Additional Numbers
- Calling Cards
- Tollfree Numbers
- Service Plan
- Service Information
- Supporting Documents
- Notes Billing Name Street Address  434    432

City 436    State    ZIP Code 442

Contact Name 438  440  Contact Title

Contact Phone    Contact Fax

406
Check

OrderNet Remote

[<<Previous] [>>Next] [Hold] [Submit]

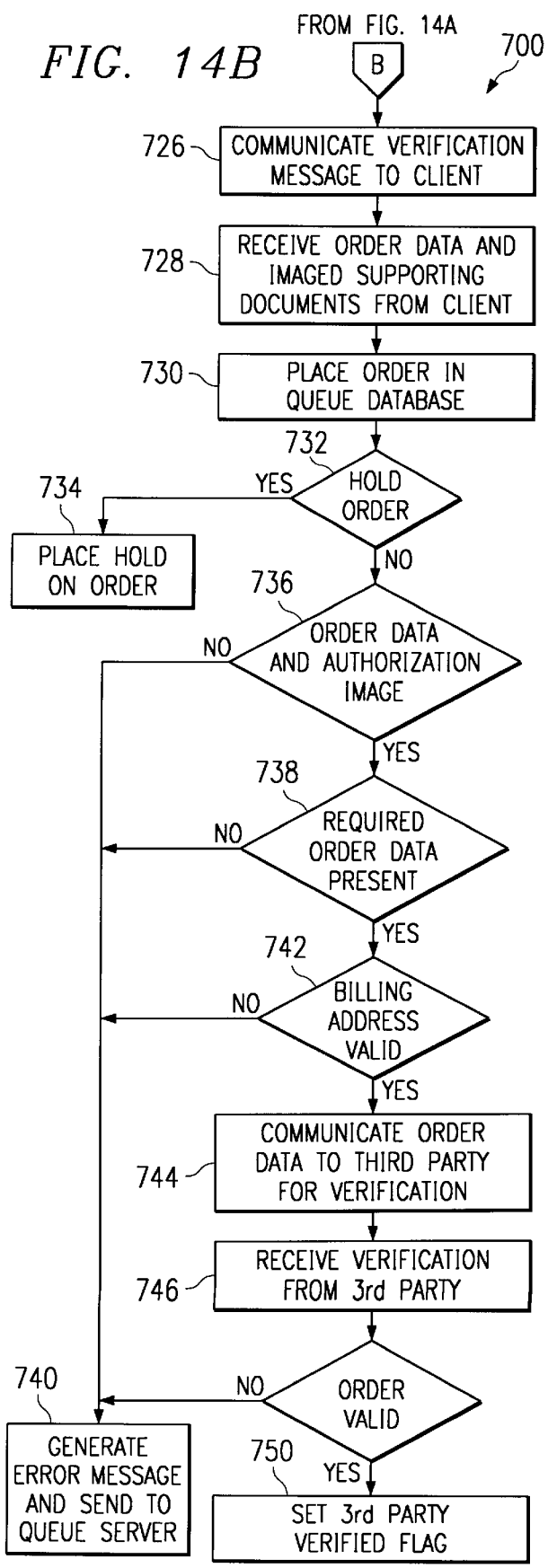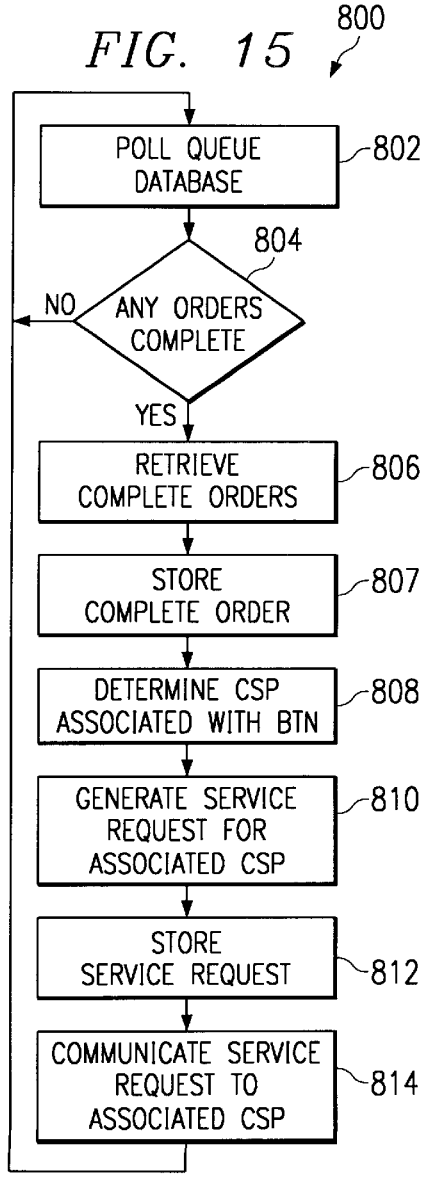

6,085,171

ORDER ENTRY SYSTEM FOR CHANGING COMMUNICATION SERVICE

TECHNICAL FIELD OF THE INVENTION

This invention relates to an order entry system, and more particularly to an order entry system for changing communication service.

BACKGROUND OF THE INVENTION

Traditionally, agents handling orders from customers desiring to change their communication service submitted orders to a home office by mail or fax. These orders included order data and associated documentation. Order data can be very detailed, including the billing address and the service plan information. Due to applicable government regulations, associated documentation may include a signature authorization form when a customer desires to change telephone service providers.

Unfortunately, this manual order entry system causes many problems. For instance, the large amount of order data required allows the agent many opportunities for errors. Also, detection of these errors does not occur until the orders arrive at the home office, or later in the provisioning thread. Further, many of the logical checks that can be performed on the order data involve vast databases that are constantly changing, making it difficult to provide the agent with this data, much less keep it updated. Moreover, mailing or faxing the orders to the home office introduces more errors due to the manual reentry process. Finally, the order forms are difficult to update because there are frequent changes in the type of communication services or rate plans offered by the home office.

SUMMARY OF THE INVENTION

In accordance with the present invention, the disadvantages and problems associated with previous order entry systems for changing communication service have been substantially reduced or eliminated. A particular embodiment of the present invention uses a connection between an agent and a server to check for many of the commonly encountered errors in order data, to submit orders electronically, including the signature authorization form, and to update the agent's order entry software.

In one embodiment of the present invention, a system for processing an order to change communication service includes a client that receives order data and an authorization image associated with a customer that desires to change communication service. The system also includes a server coupled to the client using a communication network that receives the order data and the authorization image from the client. The server generates a service request using the order data and initiates communication of the service request to a communication service provider of the customer to change communication service.

In another embodiment of the invention, a method for processing an order to change communication service includes receiving order data and an authorization image associated with a customer that desires to change communication service at a client. The method communicates the order data and the authorization image to a remote location coupled to the client using a communication network. Further, the method generates a service request using the order data and initiates communication of the service request to a communication service provider of the customer to change communication service.

The present invention has several important technical features and advantages that combine to improve the quality, accuracy, and timeliness of the order entry process and provisioning of communication services. A connection between the client and a server allows the order data to be verified during the order entry process against information in a variety of databases maintained at the server. Additionally, the client has order entry software that can perform several logical checks on the order data. These types of verifications have not been possible in earlier systems. Furthermore, the system allows the client to electronically submit the entire order, including supporting documentation, such as a signature authorization form or tax exempt form. Electronic submission results in orders being communicated to the server quicker and more accurately than mail or fax systems. The connection also allows the server to quickly communicate errors that it detects in the orders to the client for correction. Moreover, the server maintains agent profiles and order status information, and provides an automated mechanism to update the order entry software at the client. In addition, the server permits third party verifiers to access submitted orders to perform independent verifications. Other technical advantages will be readily apparent to ones skilled in the art from the following figures, description, and claims.

BRIEF DESCRIPTION OF THE DRAWINGS

For a more complete understanding of the present invention and for further features and advantages, reference is now made to the following description taking in conjunction with the accompanying drawings where like reference numerals represent like parts, in which:

FIG. 4 illustrates a host server in the order entry system;

FIG. 5 provides a representative view of orders for changing communication service;

FIG. 8 illustrates a portion of a graphical interface to receive a billing address of a customer;

FIG. 15 is a detailed flowchart of the order entry process performed at the host server.

DETAILED DESCRIPTION OF THE INVENTION

Figure 1:
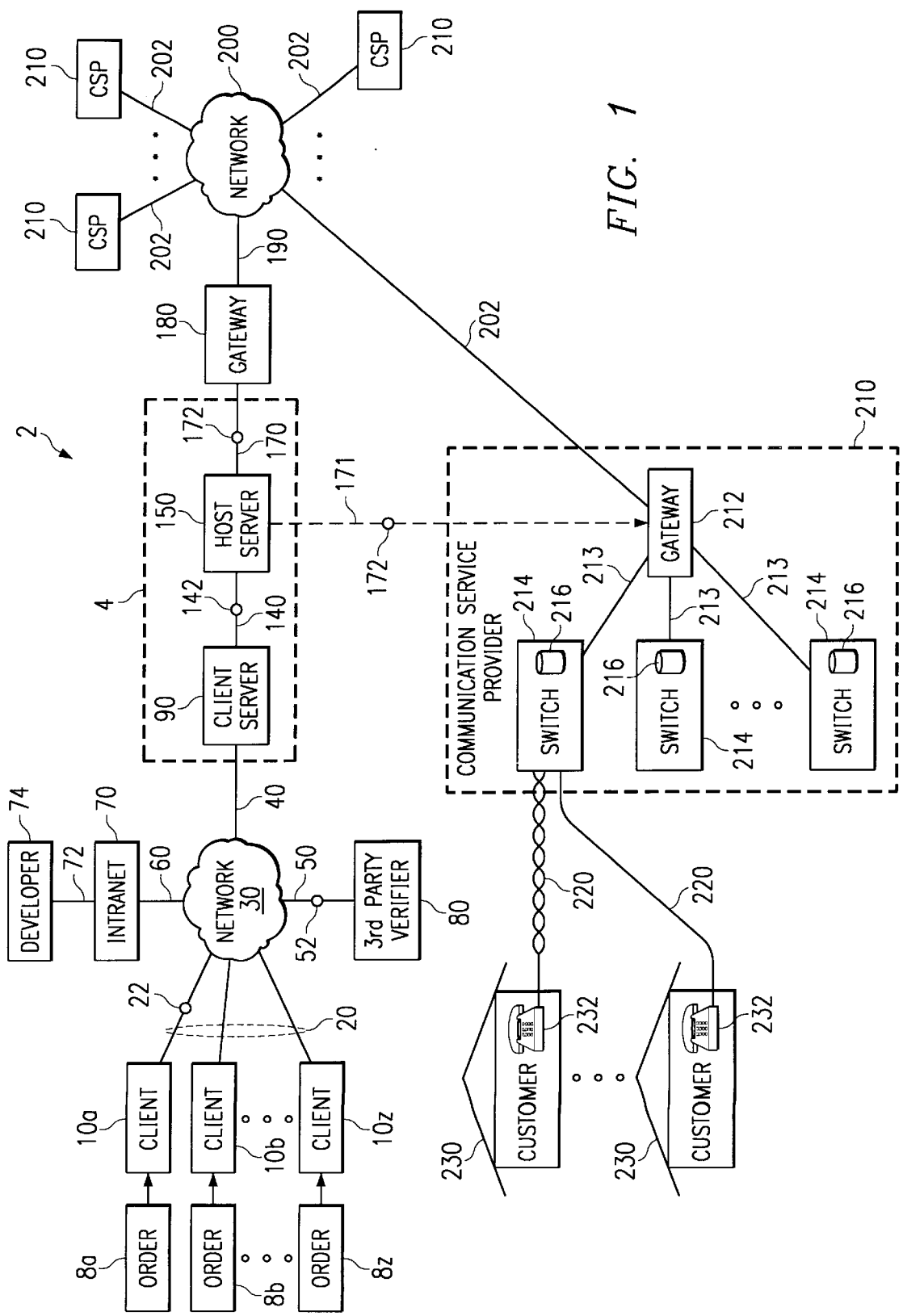
FIG. 1 illustrates an order entry system for changing communication service.

FIG. 1 illustrates an order entry system 2 for changing communication service. Order entry system 2 includes numerous clients 10a–10z (generally referred to as client 10) coupled to a server 4. Server 4 includes a client server 90 coupled to a host server 150. Client server 90 communicates with client 10 to verify and receive numerous orders 8a–8z (generally referred to as order 8) to change communication service. Host server 150 generates a service request 172 based on order 8 and communicates service request 172 to communication service providers (CSPs) 210 to change communication service.

Clients 10 couple to client server 90 using links 20, network 30, and link 40. Network 30 could be the Internet, a wide area network (WAN), a private or public switched or dedicated network, or any other type of communication network for transferring data. Network 30 also couples to an intranet 70 using link 60 and a third party verifier 80 using link 50. Intranet 70 couples to a developer 74 using link 72.

Client server 90 couples to host server 150 using link 140, and host server 150 couples to CSPs 210 in a variety of manners. In general, CSPs 210 represent any arrangement of hardware and/or software equipment operated by local exchange carriers, independent local exchange carriers, interexchange carriers, data service providers, cable television service providers, or any other entity that provides voice, video, and/or data services to customers 230. In one embodiment, host server 150 couples to CSPs 210 using link 170 to a gateway 180, which in turn couples to a network 200 using link 190. Network 200 couples to CSPs 210 using links 202. Network 200, like network 30, may include any arrangement of hardware and/or software elements to communicate data between components in order entry system 2. Network 200 supports both file transfer of service requests 172 using file transfer protocol (FTP), system network architecture (SNA) protocol, synchronous data link control (SDLC) protocol, or other suitable protocol, as well as online transactions using gateways 180 and 212. Host server 150 may also couple to CSPs 210 through physical transport of stored electronic media, as represented by reference 171.

CSPs 210 include a gateway 212 coupled to central offices, mobile telephone switching files (MTSOs), cable head ends, remote terminals, local switches, or other communication equipment (referred to generally as switches 214) servicing communication devices 232 of customers 230. Customers 230 may be residential or business customers that receive fixed or mobile communications services. Gateway 212 and switches 214 communicate using links 213. Each switch 214 includes a database 216 that contains a variety of information about customers 230 coupled to each switch 214. Customers 230 communicate and/or receive voice, video, and/or data signals from communication devices 232 using twisted pair wire, coaxial cable, fiber optic cable, wireless links, or any other wireline or wireless link (generally referred to as links 220). Accordingly, communication devices 232 may be landline or cellular telephones, computers, television converter boxes, Internet appliances, personal digital assistants (PDAs), or any other device for communicating and/or receiving voice, video, and/or data signals.

In operation, client 10 receives order 8 when a customer 230 desires to change communication service. A change in communication service contemplates changing or adding a service provider, changing or adding service offered by an existing service provider, or any other modification to services provided to customer 230 or service providers that offer the services. Client 10 performs initial verifications on order 8. Client 10 then communicates order 8 to client server 90 using link 20, network 30, and link 40.

Client 10 does not have to communicate all of order 8 to client server 90 at one time. For instance, client 10 may communicate a subset of order 8 to client server 90 for verification while client 10 awaits verification or receives additional information for order 8. Client server 90 then performs verifications on the subset of order 8 and communicates a verification message to client 10, indicating whether the subset of order 8 has been verified or not. Once client 10 completes all verifications of order 8, either locally or remotely by client server 90, client 10 communicates order 8 to client server 90 for further processing.

Client server 90 may then perform further verifications after receiving order 8. Client server 90 may also allow third party verifier 80 to access client server 90 in order to access order 8 to perform an independent verification. In a particular embodiment, an agent of third party verifier 80 performs an independent verification by reviewing part of order 8, contacting customer 230, and verbally verifying the customer's desire to change communication service. Third party verification is one manner in which service providers and regulators reduce the risk of "slamming" or changing communication service providers without the consent of customers 230. Third party verifier 80 then communicates a verification 52 to client server 90 using link 50, network 30, and link 40. In other embodiments, third party verifier 80 may have a direct connection to server 90.

Upon successfully completing the various verifications at client 10, client server 90, and third party verifier 80, order 8 is complete and ready for submission into the provisioning thread. If order 8 does not successfully complete a verification at client 10 or server 4, or encounters a problem in the provisioning thread, client 10 or server 4 will generate and communicate an error message to client 10. The agent may then review the error message, make changes to order 8 at client 10, and resubmit order 8 to server 4.

Host server 150 retrieves complete order 142 from client server 90, determines CSP 210 associated with complete order 142, and formats service request 172 for communication to CSP 210 using link 170 or physical transport 171.

CSP 210 receives service request 172 at gateway 212, and routes service request 172 to switch 214 servicing customer 230. Switch 214 then updates its database 216 to change account or service information of customer 230 that reflects the desired change in communication service. In a particular embodiment, switch 214 is a central office that updates the pre-subscribed interexchange carrier (PIC) for customer 230 stored in database 216. Thereafter, when customer 230 initiates a long distance call using communication device 232, switch 214 can properly process and bill the call.

Although the description discusses a specific embodiment of changing the PIC of customer 230, system 2 may be used to change other communication services, such as call waiting, call forwarding, Internet access, data service, video-on demand, or any other type of voice, video, and/or data service that customer 230 would desire.

System 2 offers several advantages over earlier systems, in part due to having a connection between client 10 and server 4. Having the connection between client 10 and server 4 allows parts of order 8 to be verified against data maintained at server 4 during the order entry process. Also, the connection allows for electronic submission of order 8, resulting in faster and more accurate receipt of order 8 at server 4. Further, the connection allows server 4 to easily and quickly update any software on client 10. Moreover, having a connection between server 4 and third party verifier 80 allows for quicker third party verification. Note, throughout this description, a connection between client 10 and server 4 contemplates any form of persistent or intermittent electronic communication. Additionally, client 10 may perform other verifications to help reduce errors. These and other technical advantages improve the quality, accuracy, and timeliness of the order entry process and provisioning of communication services.

Figure 2:
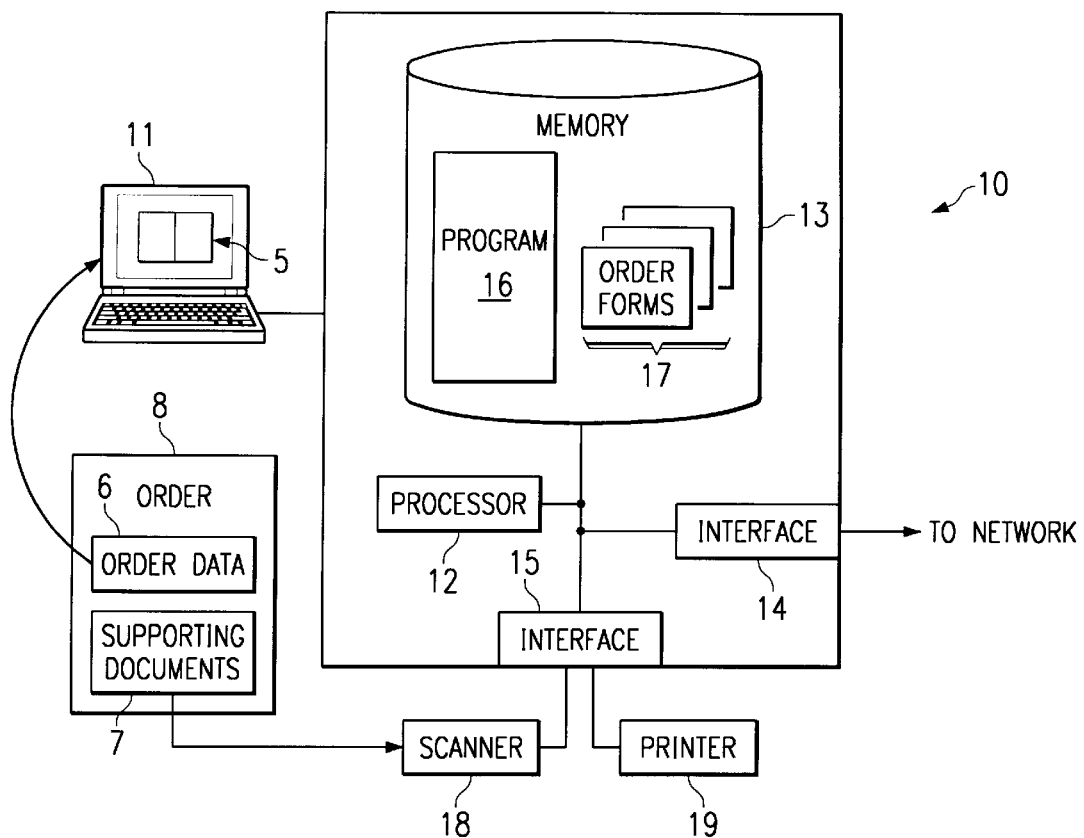
FIG. 2 illustrates a client in the order entry system.

FIG. 2 provides a detailed view of client 10 in system 2. Client 10 includes a computing and/or communicating device 11, a scanner 18, and a printer 19. Computing device 11 may be a personal computer (PC), a laptop PC, an Internet appliance, a personal digital assistant (PDA), a television, or any other type of computing or communicating device that allows customer 230 or the agent to enter order 8. Computer device 11 includes a processor 12, which couples to memory 13, network interface 14, and local interface 15. Memory 13 contains program 16 that controls the overall operation of client 10, including the presentation of order forms 17. Order forms 17 are part of a graphical interface 5 that program 16 displays on computing device 11. Program 16 can also perform several verifications on order 8. In particular embodiments, program 16 and order forms 17 are both software. Processor 12 communicates information to server 4 using network interface 14, and communicates with scanner 18 and printer 19 using local interface 15.

In operation, client 10 receives order 8 and communicates with server 4, scanner 18, and printer 19. Printer 19 could be used to print order forms 17 so that the agent may provide hard copies to customer 230. Order 8 includes order data 6, supporting documents 7, and any other information relevant to changing communication service. To begin the order entry process, client 10 displays order forms 17 in graphical interface 5 to receive order data 6. While receiving order data 6, client 10 performs several verifications on order data 6. Client 10 may also communicate subsets of order data 6 using network interface 14 to server 4 for remote verification. The results of the verifications by server 4 may then be received and displayed in graphical interface 5 on computing device 11.

Client 10 also scans supporting documents 7 using scanner 18. Supporting documents 7 can include a signature authorization form, a state or federal tax exempt certificate, or any other document relevant to changing communication service. Scanner 18 communicates electronic images of supporting documents 7 to computing device 11 using local interface 15. In other embodiments, electronic images of supporting documents 7 may be created by a light pen, an electronic tablet, a touch screen, or any other device that can create an electronic version of a document.

After client 10 receives order data 6 and electronic images of supporting documents 7, client 10 communicates this information to server 4 using network interface 14. In particular embodiments, client 10 may electronically combine order data 6 and electronic images of supporting documents 7 into order 8 for communication to server 4 through network interface 14. This allows client 10 to only have to communicate, and server 4 to only have to receive, a single message for order 8 when the order entry process is complete at client 10. Client 10 also receives updates to program 16, order forms 17, and the status of orders 8 previously communicated to server 4 using network interface 14.

Memory 13 at client 10 has been described as containing program 16 and order forms 17, which are updated by server 4 during synchronization. Thus, client 10 is what is termed a "heavy client." However, memory 13 may contain more or less sophisticated versions of program 16 and order forms 17. For instance, memory 13 may contain some or all of the databases maintained at server 4, enabling program 13 to perform more local verifications. On the other hand, memory 13 may contain only an Internet browser that receives order forms 17 from client server 90 as needed. In this embodiment, such a "thin client" may perform few or no local verifications of order 8 and may or may not synchronize program 16 and order forms 17 with server 4. Server 4 and client 10 are able to operate in any number of possible scenarios to share the order entry, processing, verification, and retrieval functions.

Figure 3:
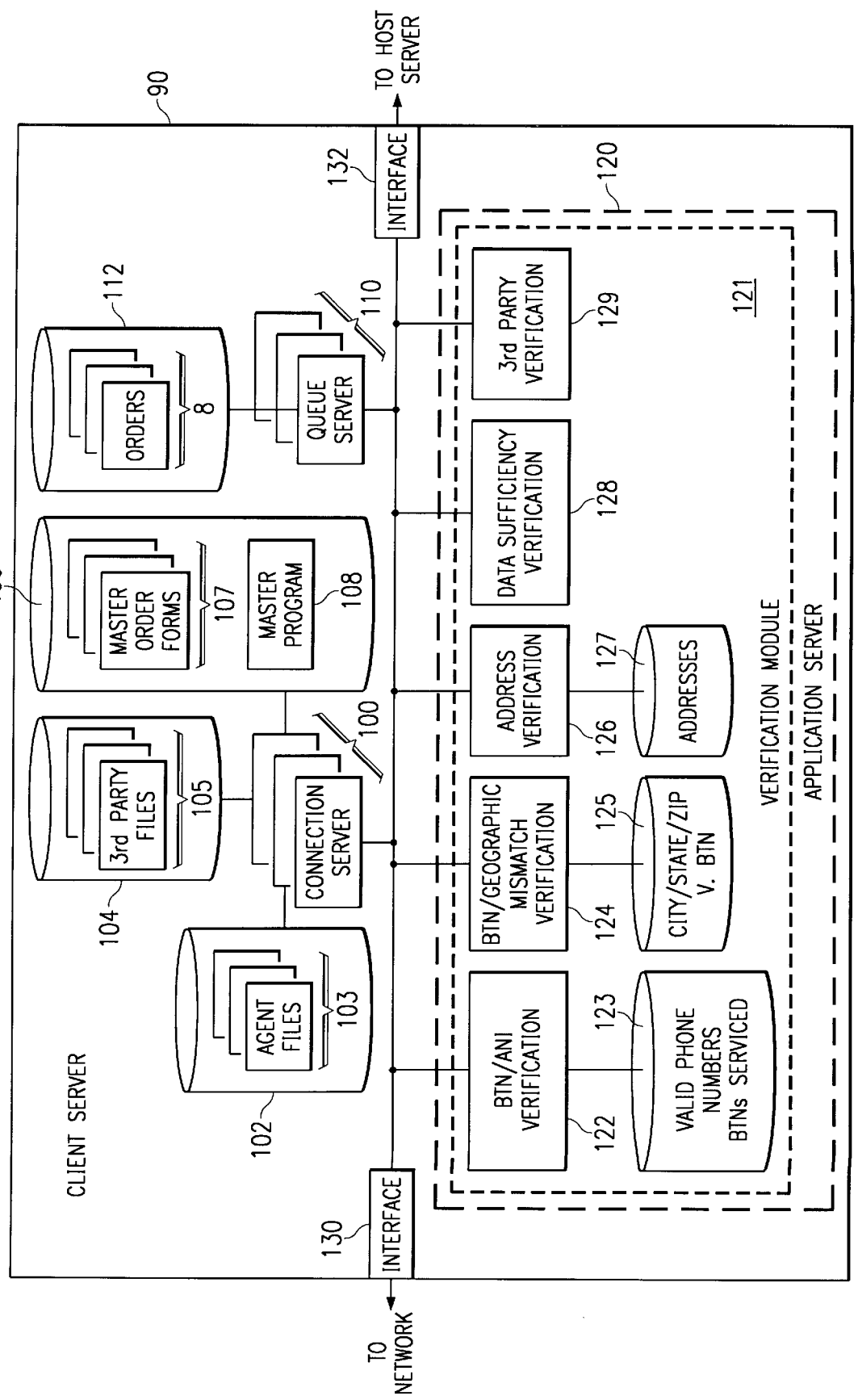
FIG. 3 illustrates a client server in the order entry system.

FIG. 3 illustrates a detailed view of client server 90 in system 2. Client server 90 receives orders 8 from client 10 and performs a variety of verifications before passing orders 8 to the provisioning thread. Client server 90 includes a variety of servers, such as connection server 100, queue server 110, and application server 120. Client server 90 communicates with client 10 using connection server 100 and interface 130 and communicates with host server 150 using interface 132.

Client server 90 also includes a variety of databases. The overall arrangement and coordination of servers and databases that together perform the functions of client server 90 is illustrative. As such, client server 90 may perform its various functions using any arrangement and coordination of servers and databases, at one or more locations. In one embodiment, the functions of connection server 100, queue server 110, and application server 120 may be distributed among several devices to accommodate the processing demands on client server 90. Also, although the components and functions of server 4 are discussed as being separated between client server 90 and host server 150, order entry system 2 contemplates any combination or arrangement of client server 90 and host server 150 as an integral or separate component at one or more locations.

Connection server 100 accesses databases 102, 104, and 106 to perform its functions. Database 102 includes a variety of agent files 103 that correspond to the agents who may use system 2. Database 104 includes third party files 105 that correspond personnel at third party verifier 80 who may access system 2. Database 106 includes a master program 108 and master order forms 107. In particular embodiments, master program 108 and master order forms 107 are both software. Developer 74 may update master program 108 and master order forms 107 using intranet 70. In other embodiments, developer 74 may have a direct connection to client server 90 or may have an Internet connection to client server 90. Client 10 may then receive updated programs and order forms through a synchronization process upon accessing client server 90. Queue server 110 provides access to database 112 which stores orders 8 from client 10.

Application server 120 includes verification module 121, which in turn includes a variety of sub-modules for performing verifications on orders 8, such as billing telephone number/automatic number identification (BTN/ANI) verification sub-module 122, BTN/geographic mismatch verification sub-module 124, address verification sub-module 126, data sufficiency verification sub-module 128, and third party verification sub-module 129. Coupled to BTN/ANI verification sub-module 122 is database 123 that contains a listing of valid NPA/NXX combinations available to provide communication service. An NPA is an area code for a telephone number, and an NXX is an exchange for a telephone number. Database 123 also contains a listing of the billing telephone numbers (BTNs) that other agents operating clients 10 have serviced, or for which an order 8 has been submitted. BTN/geographic mismatch verification sub-module 124 couples to database 125, which contains a list of the NPA/NXXs cross-referenced against anticipated city, state, and/or zip codes. Address verification sub-module 126 couples to database 127, which includes valid address information, such as street name, street address, post office box, apartment number, suite, building, or other information that can be verified as properly entered at client 10. Third party verification sub-module 129 represents commands, instructions, and/or data used by third party verifier 80 to perform independent verification of orders 8.

In operation, client 10 initially contacts client server 90 by logging into connection server 100. During the log-in process connection server 100 queries for an agent identifier (ID) before allowing client 10 to access any data or functions of client server 90. The agent ID may be a name, an assigned number, a sales ID, a password, and/or any other designation by which connection server 100 can validate an agent's identity. Connection server 100 is able to check the agent ID by accessing agent files 103 in database 102. If the agent ID is valid, connection server 100 then communicates with client 10 through interface 130 to determine whether program 16 or order forms 17 stored in memory 13 need to be updated. This may be done by comparing the modification date of program 16 and order forms 17 of client 10 and the modification date of master program 108 and master order forms 107 of client server 90. If program 16 or order forms 17 are out-of-date, connection server 100 communicates all or a portion of executable programs, files, dynamic linked libraries (DLLs), or other information to update software at client 10.

After connection server 100 completes the log-in and file synchronization process, queue server 110 then retrieves orders 8 from database 112 that correspond to the received agent ID, and communicates information regarding the retrieved orders 8 to client 10. Client 10 may then display the status of the retrieved orders 8 for further processing or modification by an agent operating client 10.

The order entry process begins as previously described with respect to client 10. During the order entry process, subsets of order data 6 may be communicated from client 10 to client server 90 using interface 130 for remote verification. One subset of order data 6 that is communicated to client server 90 is the billing telephone number (BTN) for customer 230. BTN/ANI verification sub-module 122 receives the BTN and, using database 123, verifies that the NPA/NXX of the BTN is valid. BTN/ANI verification sub-module 122 also determines whether the BTN is associated with an order 8 already submitted to client server 90. If the BTN is valid and not associated with another order 8 in client server 90, client server 90 communicates a verification back to client 10 through interface 130, and client 10 continues to receive order data 6.

Note, BTN/ANI verification sub-module 122 and database 123 may be used to verify any type of telephone number. In certain embodiments, client 10 may communicate one or several ANIs, or working telephone numbers, associated with the BTN to client server 90 for verification. BTN/ANI verification sub-module 122 and database 123 may also be used to perform these verifications. In other embodiments, client 10 may communicate part or all of a telephone number that is valid in a foreign country. Again, BTN/ANI verification sub-module 122 and database 123 may be used to perform verifications on these telephone numbers.

Client 10 may also communicate all or part of a billing address for customer 230 to verification module 121 using interface 130. Verification module 121 will then use BTN/geographic mismatch verification sub-module 124 to check the city, state, and/or zip code of the billing address against the NPA/NXX of the BTN. BTN/geographic mismatch verification sub-module accesses database 125, which stores a cross-reference between the NPA/NXX of the BTN and the associated city, state, and/or zip code received by client 10. If the BTN and the billing address correspond, verification module 121 communicates a verification to client 10, and the order entry process continues.

After receiving all information for order 8 and after performing any suitable local or remote verifications, client 10 communicates order 8 to queue server 110 using network interface 130. Queue server 110 stores order 8 in database 112. Verification module 121 may then perform further verifications on order 8. For example, data sufficiency verification sub-module 128 ensures that all images of supporting documents 7, such as a signature authorization image, accompany order data 6. Also, data sufficiency verification sub-module 128 confirms that order data 6 is sufficient to perform the requested change in communication service.

Third party verification sub-module 129 allows third party verifier 80 to independently verify order 8. To perform third party verification, third party verifier 80 logs-in to client server 90. The person operating third party verifier 80 provides a third party ID, much in the same manner as an agent operating client 10 provides an agent ID. Connection server 100 will not allow third party verifier 80 to access data or functions of client server 90 until an appropriate third party ID has been received. Once connection server 100 recognizes third party verifier 80 by accessing third party files 105 in database 104, third party verification sub-module 129 communicates data from order 8, which could include electronic images of supporting documents 7, in database 112 to third party verifier 80. Third party verifier 80 then reviews order 8, contacts customer 230 associated with order 8, and receives verbal confirmation from customer 230 that order 8 is proper and desired. Third party verifier 80 then communicates verification 52 to client server 90 over link 50, network 30, and link 40. Client server 90 receives verification 52 through network interface 130 and routes verification 52 to third party verification sub-module 129. Third party verification sub-module 129 then communicates a message to queue server 110, which updates the status of order 8 in database 112. After all client 10, client server 90, and third party 80 verifications are satisfied, order 8 is complete and ready for presentation to host server 150 for provisioning.

If order 8 does not pass the verifications performed by client server 90 and/or third party verifier 80, client server 90 updates the status of order 8 in database 112. When client 10 later logs-in to client server 90 with the same agent ID, queue server 110 communicates an error message to client 10 so that the agent can correct the error. Client 10 may then resubmit order 8 to queue server 110, and verification module 121 again performs its verifications. This process may be repeated several times until order 8 passes all verifications.

FIG. 4 provides a detailed view of host server 150, which receives complete orders 142 from client server 90, generates service requests 172 based on information in complete orders 142, and communicates service requests 172 to associated CSP 210. Host server 150 includes order retrieval module 152, BTN/CSP association module 154, CSP formatting module 156, and CSP communicator module 158. Coupled to order retrieval module 152 is a database 153, which stores complete orders 142 retrieved from client server 90. In one embodiment, complete orders 142 may contain only the portions of order 8 used for provisioning service. For example, complete orders 142 stored in database 153 may not need to include supporting documents 7 or detailed address information of customer 230. Database 155 couples to BTN/CSP association module 154 and contains a directory of CSPs 210 based on BTNs. CSP formatting module 156 couples to database 157, which contains CSP care records 160 or service request formats approved and/or recognized by each CSP 210 in system 2. CSP communicator module 158 couples to database 159, which contains service requests 172 ready for communication to CSPs 210 for provisioning.

Host server 150 communicates with client server 90 using interface 166 and with gateway 180 using interface 168. Host server 150 may also communicate with associated CSP 210 by storing service requests 172 on removable media 167 for physical delivery to associated CSP 210. Although host server 150 as illustrated includes a variety of modules and databases, it should be understood that host server 150 could consist of any number of modules, servers, and/or databases at one or more locations. Further, the functions that host server 150 performs could be distributed in any manner between any number of modules, servers, and/or databases.

In operation, order retrieval module 152 systematically polls database 112 of client server 90 to determine whether any orders 8 are complete. Alternatively, order retrieval module 152 may receive communication of complete orders 142 initiated by client server 90. If order 8 is complete in database 112, order retrieval module 152 retrieves information for complete order 142 using link 140 and interface 166 and stores complete order 142 in database 153. BTN/CSP association module 154 determines CSP 210 associated with complete order 142 by cross-referencing the BTN for complete order 142 with CSPs 210 in system 2, which are represented in database 155. Once the associated CSP 210 has been determined for complete order 142, CSP formatting module 156 generates service request 172 in the proper format for the associated CSP 210. CSP formatting module 156 retrieves CSP care record 160 or service request format for associated CSP 210 stored in database 157. CSP care record 160 specifies the data and the form of the data expected by associated CSP 210 in service request 172 to change the communication service of customer 230. CSP formatting module 156 then generates service request 172 from data in complete order 142 and communicates service request 172 to database 159, which stores it. In a particular embodiment, CSP formatting module 156 stores a presubscribed interexchange carrier (PIC) associated with the organization that operates server 4 and includes the PIC in service request 172. CSP communicator module 158 initiates electronic communication of service request 172 in database 159 to associated CSP 210 using interface 168 or stores service request 172 on removable media 167 for physical delivery to associated CSP 210.

Upon receiving service request 172, CSP 210 updates database 216 in associated switch 214, and communicates a message for eventual storage in database 112 in client server 90 indicating successful provisioning. Client server 90 then updates the status of order 8 in database 112 to reflect successful provisioning. Client 10 reflects the new status of order 8 when retrieving order status information using the agent ID that originated order 8.

Order 8 may be placed on hold by client 10 if data necessary for order 8 is not present when client 10 receives order 8. Placing order 8 on hold stores it in database 112 of client server 90, but may delay performance of one or more verifications. Thus, client 10 may later access and display order 8 to receive missing data.

FIG. 5 shows a representative table in database 112 of orders 8. Each order 8 includes an order number 252, a BTN 254, an agent ID 256, an order status 258, order data 260, and imaged supporting documents 262. Order numbers 252 are internal tracking numbers to track order 8 in system 2 after it has been communicated by client 10. BTN 254 of each order 8 is the telephone number for which service is being changed. Agent ID 256 specifies the agent for each order 8. Order status 258 specifies the current status of each order 8. Order data 260 and imaged supporting documents 262 include the information in order 8 originally communicated from client 10 to client server 90.

In a particular embodiment, order status 258 may be "Hold," "Awaiting 3rd Party Verification," "Action Required," "Complete," or "Provisioned." An order 8 whose order status 258 is "Hold" is waiting for the agent to revise, update, or supplement the data in the order. An order status 258 of "Awaiting 3rd Party Verification" signifies that third party verifier 80 has not yet verified order 8. An order 8 that has "Action Required" as its order status 258 has not passed all of the verifications in verification module 121. As discussed previously, server 4 will communicate the errors detected with order 8 to client 10 upon log-in using an agent ID that corresponds to agent ID 256 for the order. Then, the agent may take the appropriate action to correct the order 8. An order 8 whose order status 258 is "Complete" has passed all of the verifications and is awaiting provisioning by one of CSPs 210. Host server 150 may then retrieve information for complete order 142 to initiate the provisioning. Order status 258 of "Provisioned" indicates that database 216 of associated switch 214 for customer 230 has provisioned order 8.

Figure 6:
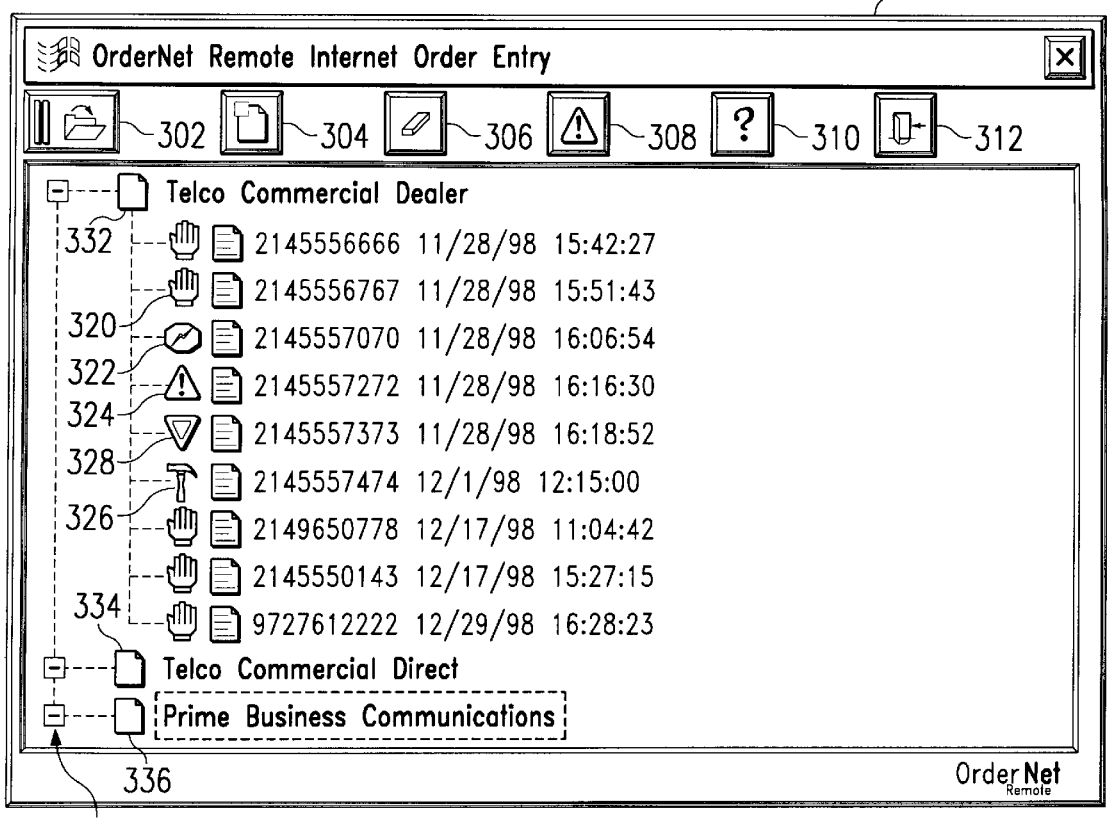
FIG. 6 illustrates a portion of a graphical interface to display the status of an agent's orders communicated to the client server.

FIGS. 6–11 present portions of graphical interface 5 displayed by client 10 that allow the agent to prepare, submit, correct, and review orders 8. FIG. 6 illustrates screen 300, which displays the status of orders previously communicated from client 10 to client server 90 for a specific agent ID 256. In this illustrated embodiment, the agent associated with the specific agent ID 256 used to log-in to client server 90 is associated with a number of orders 8 entered at client 10 by agent ID 256. The information in screen 300 is displayed on client 10 after connection server 100 verifies agent ID 256 against those stored in database 102 and retrieves orders 8 in database 112 having a matching agent ID 256.

In this case, the agent is qualified to handle three levels of service 330: telco commercial dealer 332, telco commercial direct 334, and prime business communications 336. Note, more, less, or different service levels could be offered by server 4. Program 16 at client 10 controls which service levels 330 the agent may access using information communicated from agent files 103 in client server 90. Thus, client 10 only displays service levels 330 that the agent is qualified to handle. Client server 90 may update an agent's service levels 330 upon promotion, reassignment, or certification of the agent.

Under each service level 330, client 10 displays order status 258 of orders 8 that are associated with agent ID 256 in queue server 110. For example, under telco commercial dealer 332, nine orders 8 are shown with symbols 320, 322, 324, and 326 corresponding to order status 258 of each order 8. Symbol 320 indicates order status 258 is "Hold;" symbol 322 indicates that order status 258 is "Complete;" symbol 324 indicates that order status 258 is "Action Required;" symbol 326 indicates that order status 258 is "Provisioned;" and symbol 328 indicates that order status 258 is "Awaiting 3rd Party Verification."

Screen 300 also presents the user with several functions. By clicking on button 302, the agent may open displayed orders 8 to review their data. By clicking on button 304, the agent may create a new order. Button 306 allows the agent to erase an order. Button 308 allows the agent to take action on an order whose order status 258 is "Action Required." Button 310 allows the agent to obtain help on screen 300, and button 312 allows the agent to log-out of client server 90.

Figure 7:
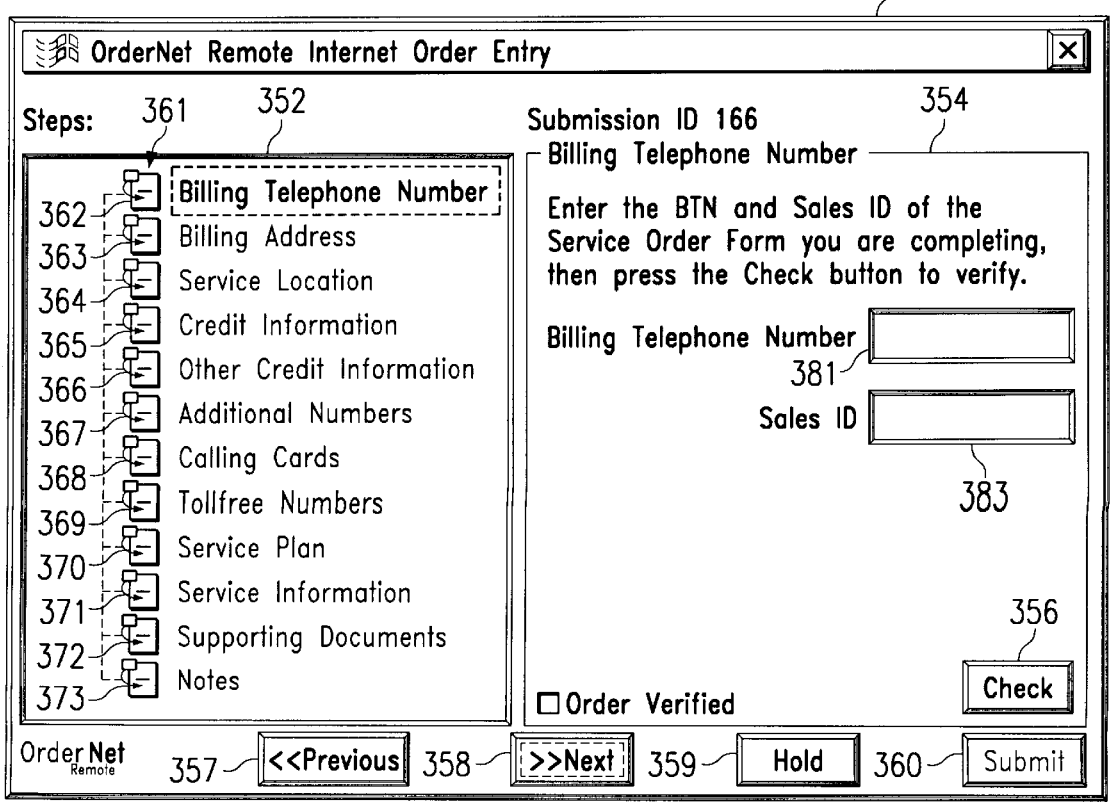
FIG. 7 illustrates a portion of a graphical interface to initiate the order entry process.

FIG. 7 illustrates the initial screen 350 presented by client 10 when it detects activation of button 304 to create a new order. Screen 350 includes a first section 352 and a second section 354. First section 352 contains a business rules list 361 for entering order 8, and second section 354 presents the selected business rule. Each business rule in business rules list 361 contains the presentation format and logic for receiving specific information for order 8. For example, business rules may include billing telephone number 362, billing address 363, additional numbers 367, service plan 370, supporting documents 372, and any other business rule that facilitates the retrieval of relevant information for order 8. By stepping through business rules list 361 one at a time, client 10 systematically prompts the agent for information to prepare order 8 for submission.

Billing telephone number 362 is the first business rule in business rules list 361, which in a particular embodiment must be completed before proceeding to other business rules. To complete billing telephone number 362, client 10 receives BTN 254 for order 8 in field 381 and the sales ID in field 383. Note, sales ID may or may not be the same as agent ID 256. Client 10 waits for activation of button 356, which causes client 10 to communicate BTN 254 in field 381 to server 4 for verification. As discussed earlier, the NPA/NXX of BTN 254 is verified by BTN/ANI verification sub-module 122. This module also verifies that BTN 254 is not associated with another order 8 in database 112. If BTN 254 is not valid or another order 8 already exists in database 112 with the same BTN 254, client 10 will not allow the order entry process to continue. If BTN 254 is valid and no other agent has serviced BTN 254, client 10 allows the order entry process to proceed to the next order entry screen in business rules list 361 when activation of button 358 is detected.

Button 358 is one of a group of commonly recurring buttons 357–360 in the illustrated embodiment. Button 357 allows the agent to move backward through business rules list 361. Button 359 allows the agent to place order 8 on hold, which communicates the order to queue server 112. Button 360 allows the agent to submit order 8 to queue server 112 for further processing. Note, in screen 350, button 360 may not be active since order 8 requires more data. When client 10 detects sufficient data for order 8, button 360 will be displayed similar to buttons 357–359. In other embodiments, fewer, more, and/or different buttons could be used for navigation.

FIG. 8 illustrates screen 400, which allows the agent to enter the billing address. The billing address includes the billing name (field 432) and address (fields 434–442). Program 16 at client 10 ensures that necessary fields in screen 400 contain data. Upon detecting activation of button 406, client 10 verifies that the necessary fields contain data, and communicates the city, state, and/or zip code for the billing address to server 4 for remote verification. BTN/geographic mismatch verification sub-module 124 verifies the city, state, and/or zip code versus the NPA/NXX of the BTN. If the address is verified, server 4 communicates a message back to client 10, and client 10 will allow the order entry process to continue. If the address is not verified, client server 90 communicates an error message to client 10 to prompt the agent to correct the information.

Figure 9:
FIG. 9 illustrates a portion of a graphical interface to register additional telephone numbers associated with a billing telephone number.

FIG. 9 illustrates screen 450, in which additional telephone numbers associated with BTN 254 may be entered. The additional telephone numbers are identified by entering associated automatic number identification (ANI) information. Client 10 allows addition of ANIs when it detects activation of button 452. Selecting option 460 enables accounting codes for an ANI. Customers 230 use the accounting codes to classify calls made from an ANI. Selecting option 462 indicates that the PIC for the ANI is to be changed. As noted earlier, in some embodiments, server 4 may verify the ANIs as client 10 receives them. In such a case, screen 450 will graphically designate the valid ANIs, and client 10 will allow the agent to select among the valid ANIs for changing communication service.

Figure 10:
FIG. 10 illustrates a portion of a graphical interface to enter a service plan selected by the customer.

FIG. 10 illustrates entry screen 500, where client 10 receives the service plan which the customer desires. This selection is made in pull down menu 510. Pull down menu 510 may contain a variety of service plans from which the customer may select. The variety of service plans in pull down menu 510 depends on the sales ID. Thus, program 16 may restrict the agent's access to service plans that the agent is entitled to sell. After receiving a product selection from pull down menu 510, client 10 may display additional options in options area 520. Note, for some product selections, no options will be available in options area 520. In the case illustrated, however, client 10 may select from several options for the product selection. Pull down menu 522 specifies the revenue commitment for the customer; pull down menu 524 specifies the period for which the customer is committing to the service plan; and pull down menu 526 specifies the international plan that the customer desires. In other embodiments, there may be more, fewer, or different options in options area 520 for each product selection. When client 10 receives all of the necessary data on screen 500 and detects activation of button 502, the order entry process continues to the next business rule.

Figure 11:
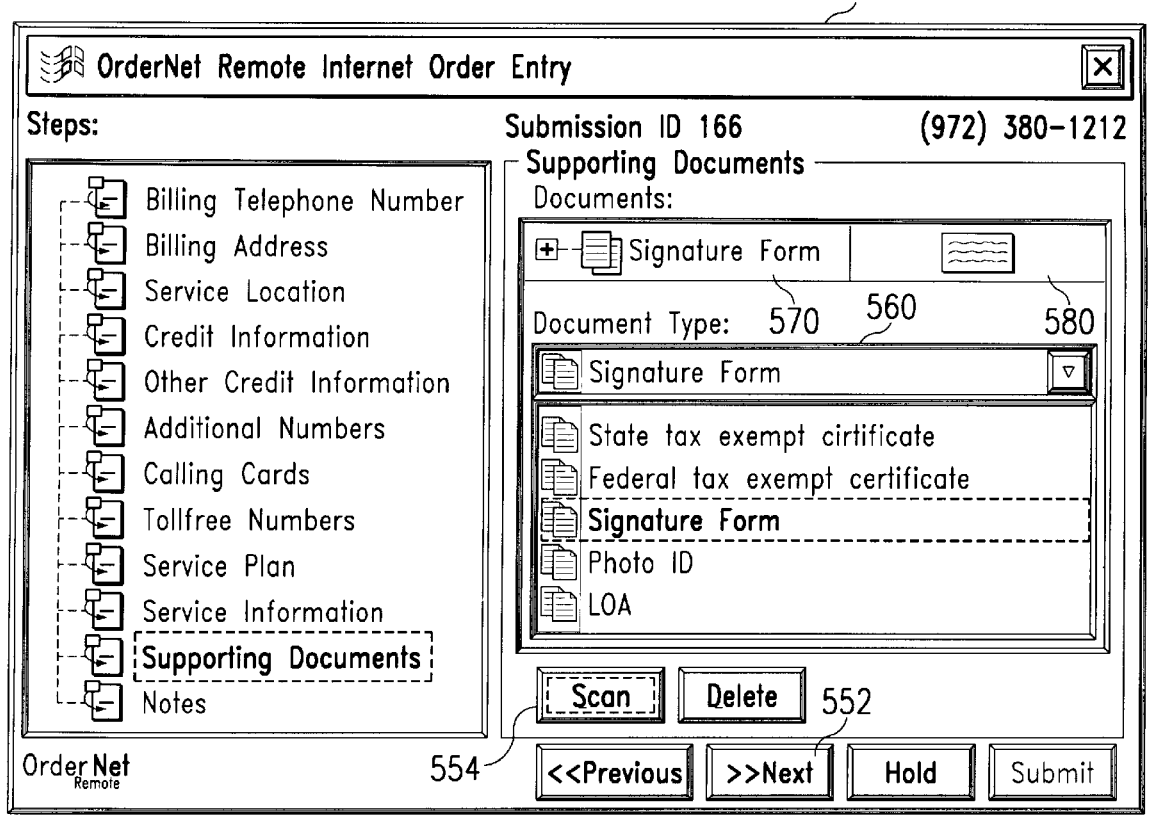
FIG. 11 illustrates a portion of a graphical interface to create electronic images of supporting documents for the order.

FIG. 11 illustrates screen 550, which allows entry of supporting documents 7 for order 8. Scanner 18 coupled to computing device 11 scans supporting documents 7 in response to activation of button 554, and client 10 displays an image of scanned supporting document 7 in section 580 of screen 550. Next, client 10 receives the selection of the supporting document type from activation of pull down menu 560. Once client 10 detects selection of the supporting document type, it displays the supporting document type in section 570 of screen 550. After client 10 receives images of all of the necessary supporting documents 7 and detects activation of button 552, the order entry process continues to the next business rule.

Note, although only five rules in business rules list 361 have been discussed in detail, the order entry process is similar for the rest of the rules in business rules list 361. Further, although order entry is described in a particular sequence, the business rules may be presented in any order. Also, the business rules may be modified to enter order data in any logical order, and the verifications performed at client 10 and client server 90 may be swapped and/or modified.

Service location 364 in business rules list 361 allows client 10 to receive information about the service location for customer 230, if it is different from the billing address. Credit information 365 and other credit information 366 allows client 10 to receive credit information about customer 230. The information received in credit information 365 may depend on what type of business customer 230 possesses. Other credit information 366 may be used when additional credit information is required, such as when customer 230 is a subsidiary corporation. Calling cards 368 allows client 10 to receive information regarding any calling cards that customer 230 desires. The type of information that may be required in calling cards 368 includes what names to place on the calling cards, calling restrictions, and personal identification numbers (PINs). Tollfree numbers 369 allows client 10 to receive information regarding any toll-free numbers that customer 230 wishes to establish or modify. Calls on the toll-free number may ring to the BTN 254 or to an ANI associated with BTN 254. Service information 371 allows client 10 to receive information regarding additional services that customer 230 desires, such as accounting codes and Internet service. Notes 373 allows client 10 to receive free-form text in support of order 8. In some embodiments, the information in Notes 373 may be collated by server 4 and used to update master order forms 107, master program 108, or provide new services.

Client 10 may receive order 8 from an agent or directly from customer 230. Graphical interface 5 may provide additional screens, hypertext links, help screens, supporting documentation, imaged documents, governmental regulations, and any other information that would assist customer 230 or the agent in the order entry process of system 2.

Figure 12:
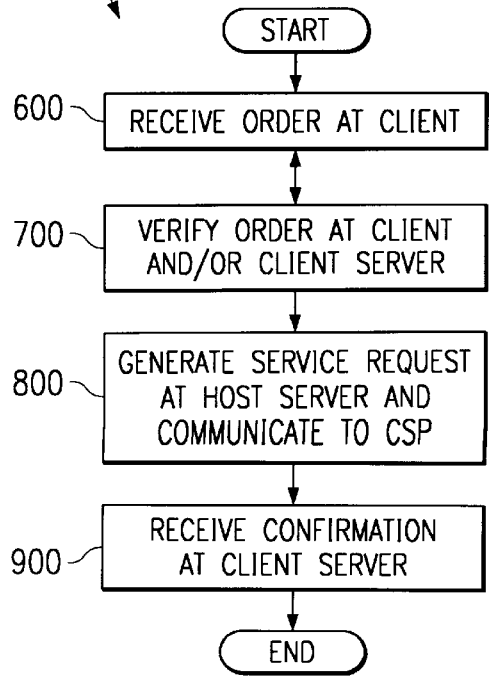
FIG. 12 is a flowchart of the order entry process.

FIG. 12 provides a top level flow chart of order entry process 500. Order entry process 500 begins at step 600 when client 10 receives order 8. Client 10 and/or client server 90 perform a variety of verifications on order 8 at step 700. Client server 90 may perform some of the verifications (e.g., BTN verification, address mismatch) during the order entry process at step 600. After verifications are complete, host server 150 generates service request 172 and communicates service request 172 to CSP 210 associated with customer 230 at step 800. Once associated CSP 210 updates database 216 at switch 214 servicing customer 230, client server 90 receives a confirmation of the change in service at step 900.

Figure 13A:
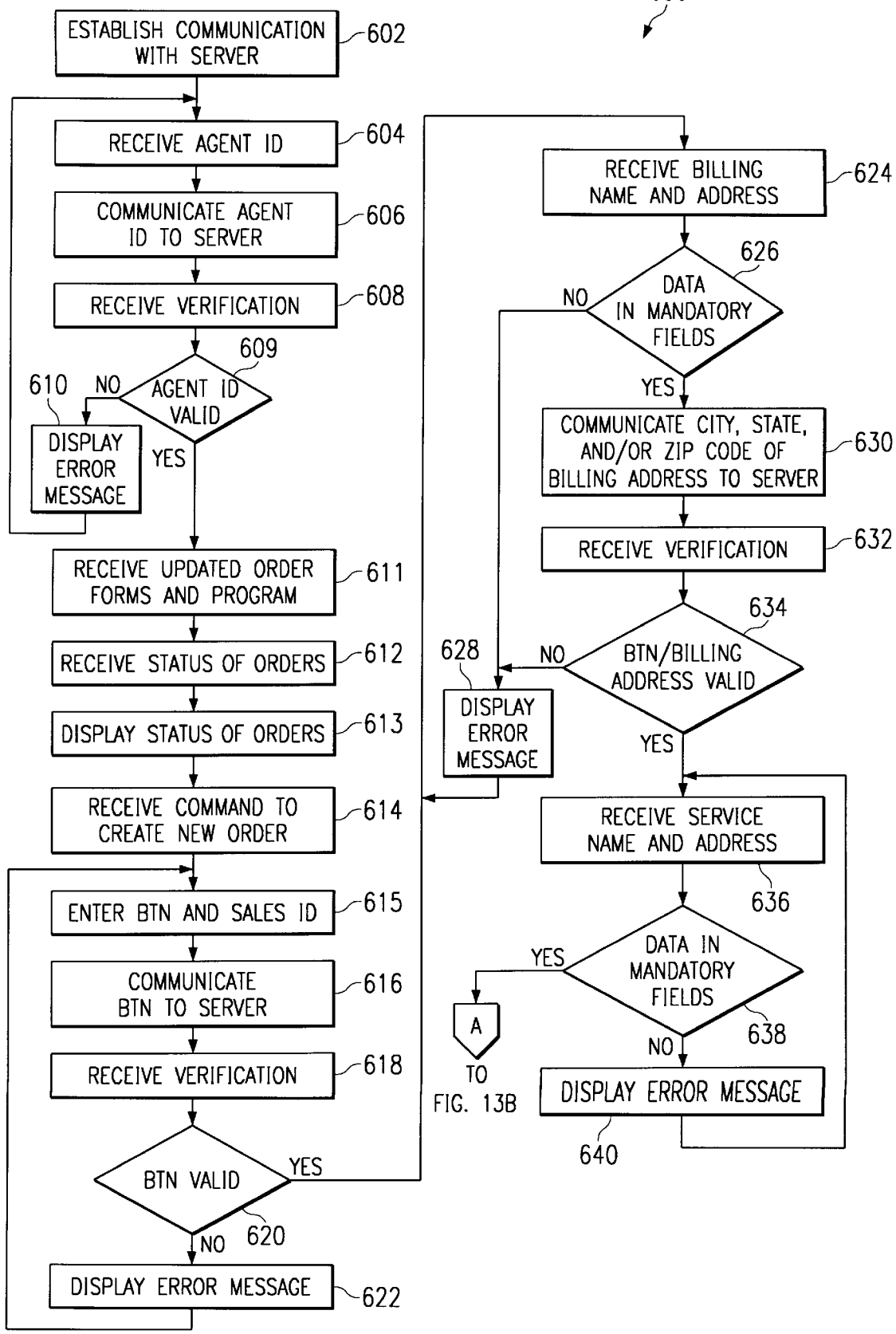
FIG. 13 is a detailed flowchart of the order entry process performed at the client.
Figure 13B:
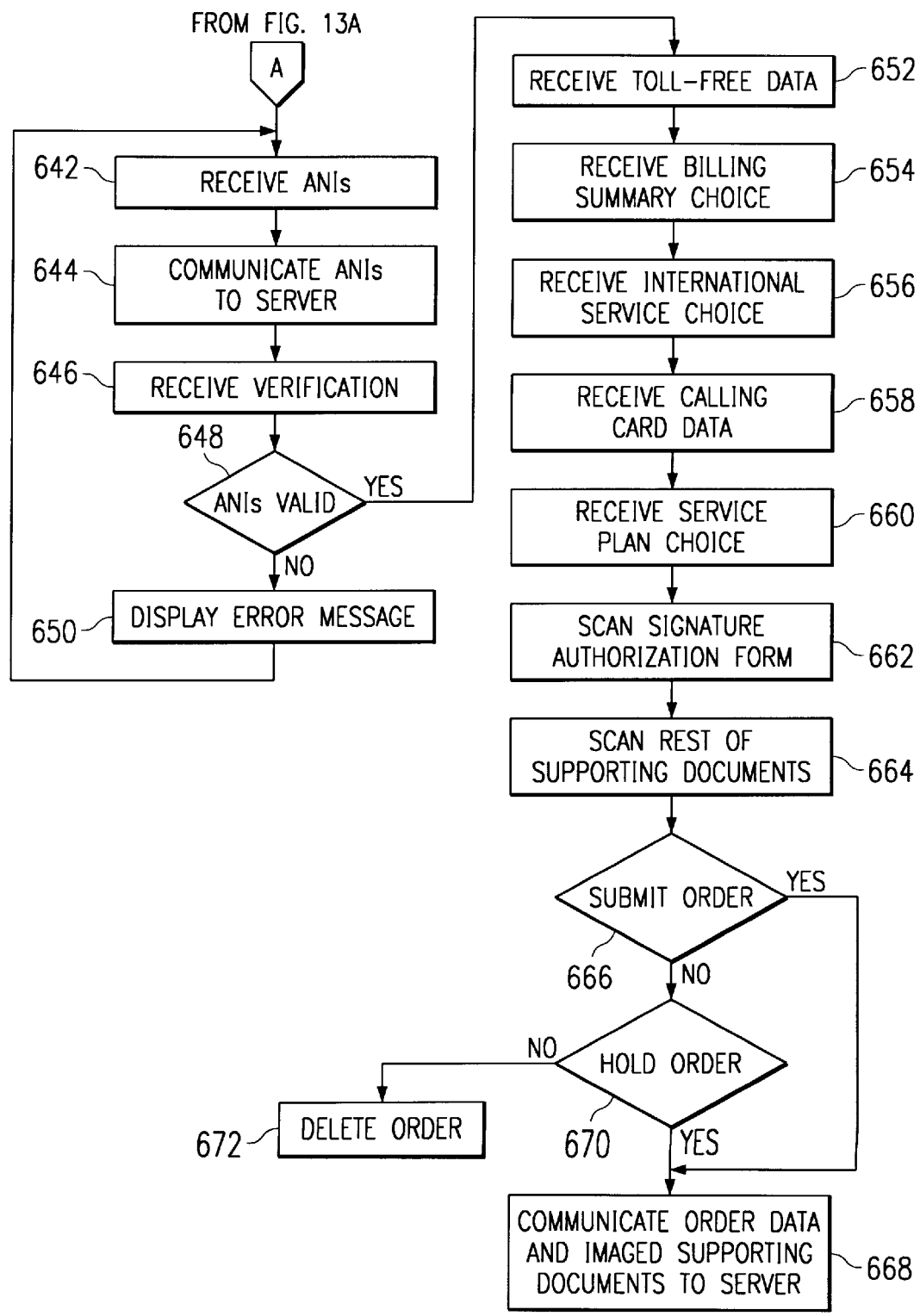

FIG. 13 is a detailed flowchart of step 600, in which client 10 receives order 8. The process begins at step 602 where client 10 establishes communication with server 4. Client 10 receives agent ID 256 at step 604, and communicates agent ID 256 to server 4 at step 606. Client 10 receives verification of agent ID 256 at step 608. If agent ID 256 is valid as determined at step 609, the order entry process continues. If agent ID 256 is not valid, then client 10 displays an error message at step 610 and awaits receipt of another agent ID 256 at step 604.

Assuming the reviewed agent ID 254 is valid, the order entry process continues at step 611, where client 10 receives updated master order forms 107 and master program files 108 from server 4. After the synchronization is complete, client 10 receives order status 258 of orders 8 in database 112 associated with the reviewed agent ID 256 at step 612, and displays order status 258 of the received orders 8 in screen 300 at step 613. Client 10 detects the activation of button 304 to create a new order at step 614.

To initiate the order entry process, client 10 displays screen 350 and receives BTN 254 and the sales ID for order 8 at step 615. Client 10 communicates BTN 254 to server 4 for verification at step 616 in response to activation of button 356. Once server 4 performs its verification, client 10 receives the result of the verification at step 618. This verification checks the NPA/NXX of BTN 254 and confirms that no other agent has serviced BTN 254. If the verification fails as determined at step 620, client 10 displays an error message at step 622 and waits for another BTN 254 and sales ID at step 615. If BTN 254 is valid at step 620, the process continues.

Client 10 receives the billing name and address for customer 230 at step 624. Client 10 then determines whether the mandatory fields contain data at step 626. If the mandatory fields do not contain data, client 10 displays an error message at step 628, and client 10 waits to receive data at step 624. If data is in all of the mandatory fields at step 626, client 10 communicates the city, state, and/or zip code of the billing address to server 4 for remote verification at step 630. Server 4 compares the expected geographic location of the NPA/NXX of the BTN 254 to the city, state, and/or zip code of the billing address, and communicates the result of the comparison to client 10 at step 632. If BTN 254 is not valid when compared to the billing address at step 634, client 10 displays an error message at step 628 and waits to receive a new billing address at step 624. However, if BTN 254 is valid when compared to the billing address at step 634, the process continues.

Client 10 receives the service name and address at step 636. Client 10 invokes logic to ensure data is entered in certain mandatory fields at step 638. If client 10 has not received data in all of the mandatory fields at step 638, client 10 displays an error message at step 640 and waits to receive a new service name and address at step 636. However, if client 10 has received all of the data in the mandatory fields, then the process continues.

Client 10 receives ANIs associated with BTN 254 at step 642. Client 10 then communicates the ANIs to server 4 at step 644 for verification. Client 10 receives the result of the ANI verification at step 646. If the ANI's are invalid, client 10 displays an error message at step 650 and waits for entry of new ANIs at step 642. However, if the ANIs are valid, the process continues.

In steps 652–660, client 10 receives a variety of other data for order 8 to change communication service. At step 652, client 10 receives any toll-free data associated with BTN 254. Client 10 receives any billing summary choices that the customer desires at step 654, and any international service choices that the customer desires at step 656. At step 658, client 10 receives any calling card data for the customer. Client 10 receives the service plan choices that the customer desires at step 660.

Client 10 scans a signature authorization form at step 662, and any other supporting documents 7 at step 664. Other supporting documents 7 could include state tax exempt certificates, a photo ID, or any other document relevant to changing communication service. Scanning supporting documents 7 and associating these document images with order 8 allows server 4 to retain electronic copies of important documentation that may be required by regulatory agencies, customers 230, or quality control procedures to confirm proper processing of orders 8.

After client 10 receives order data 6 and supporting documents 7, client 10 may implement one of several options. First, client 10 may receive a command to submit order 8 at step 666. Client 10 will then communicate order data 6 and electronic images of supporting documents 7 to server 4 at step 668. Client 10 may also receive a command to place order 8 on hold at step 670. In a particular embodiment, client 10 communicates order 8 to be placed on hold to server 4 at step 668 to ensure data integrity. Client 10 may also delete order 8 at step 672 if customer 230 and/or the agent decide not to proceed. Generally, client 10 contemplates a number of commands executed through graphical interface 5 to create, modify, delete, hold, or otherwise manage orders 8 entered in client 10.

The process to correct order 8 after submission proceeds in a similar manner as described above. To correct order 8, client 10 begins with steps 602–612. Client 10 then displays screen 300 at step 613, where orders 8 having errors or needing additional work are indicated by symbol 320 ("Hold") and symbol 324 ("Action Required"). Upon activation of button 308 ("Review Action Items") client 10 displays information on the deficiency of "Action Required" orders 8. Client 10 may then present a number of screens relating to business rules, showing previously entered data. Thus, client 10 only needs to receive order data 6 or supporting documents 7 to correct the deficiency. Client 10 provides quick and efficient navigation through the order entry process using business rules list 361 and button 357 ("Previous") and button 358 ("Next"). After client 10 receives the corrections and performs any verifications, either at client 10 or server 4, client 10 may submit, hold, or delete order 8 at steps 666–672.

Figure 14A:
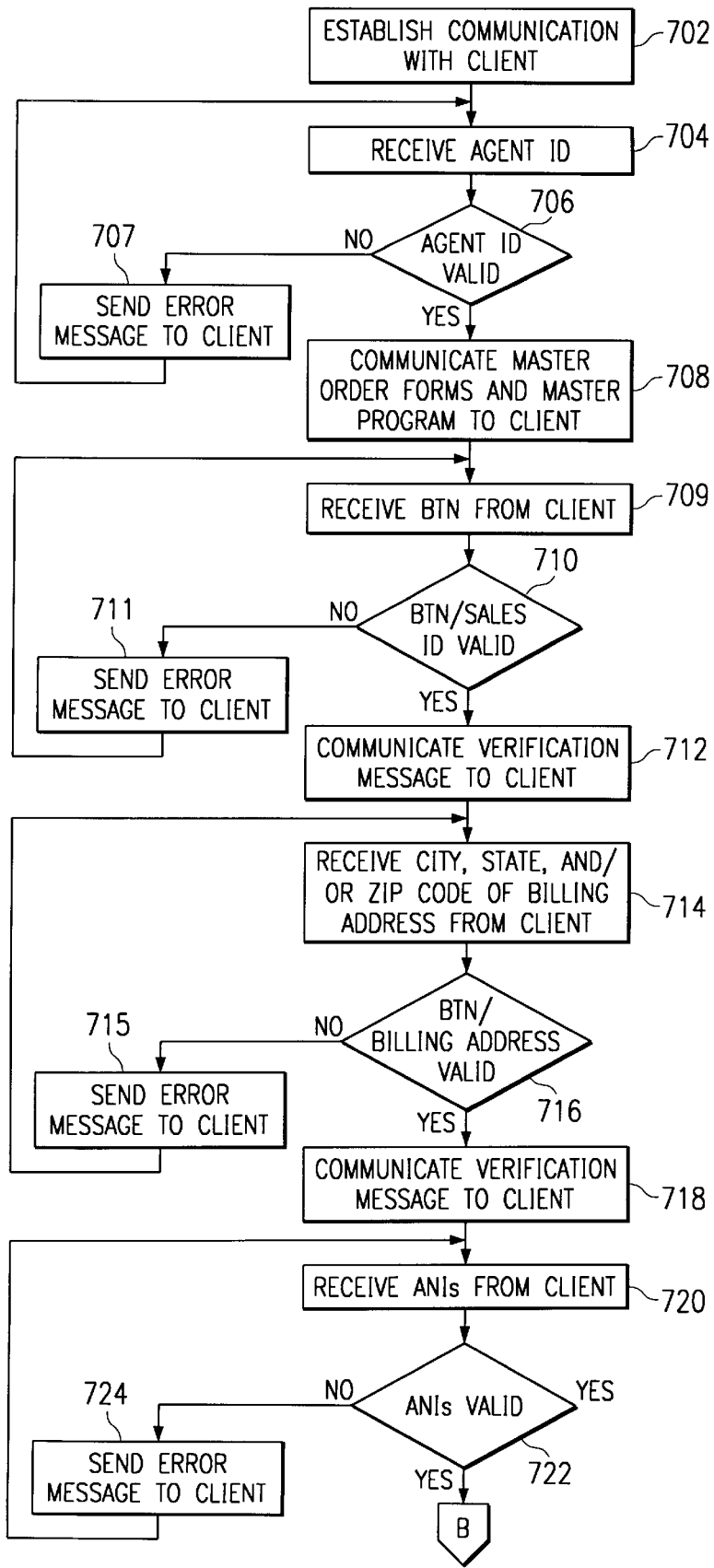
FIG. 14 is a detailed flowchart of the order entry process performed at the client server.

FIG. 14 is a detailed flowchart of step 700 in the order entry process 500. Step 700 at client server 90 works in conjunction with step 600 at client 10. To begin, connection server 100 establishes communication with client 10 at step 702, and receives agent ID 256 at step 704. Connection server 100 then compares agent ID 256 with agent files 103 in database 102 at step 706. If agent ID 256 is not valid, connection server 100 communicates an error message to client 10 at step 707, and waits to receive a new agent ID 254 at step 704. If agent ID 254 is valid, connection server 100 may communicate all or a portion of master order forms 107 and master program 108 to client 10 at step 708.

After file synchronization, connection server 100 receives BTN 254 from client 10 at step 709. BTN/ANI verification sub-module 122 then verifies BTN 254 is valid and determines whether other orders 8 concern BTN 254 at step 710. If BTN 254 is invalid or another order 8 is in database 112 for BTN 254, server 4 communicates an error message to client 10 at step 711, and waits to receive a new BTN 254 at step 709. However, if BTN 254 is valid and no other order 8 in database 112 concerns BTN 254, server 4 communicates a verification message to client 10 at step 712, and the order entry process continues.

Connection server 100 receives the city, state, and/or zip code of the billing address from client 10 at step 714. BTN/geographic mismatch verification sub-module 124 then performs its verification at step 716. If BTN 254 does not correlate with the city, state, and/or zip code of the billing address, server 4 communicates an error message to client 10 at step 719 and waits to receive a new city, state, and/or zip code for a billing address at step 714. If the billing address correlates with BTN 254, the entry process continues at step 718, where server 4 communicates a verification message to client 10. At step 720, server 4 receives ANIs from client 10, and BTN/ANI verification sub-module 122 validates ANIs at step 722. If the ANIs are not valid, server 4 communicates an error message to client 10 at step 724 and waits to receive a new set of ANIs at step 720. If the ANIs are valid at step 722, server 4 communicates a verification message to client 10 at step 726.

Server 4 receives order data 6 and images of supporting documents 7 from client 10 at step 728. Order data 6 and supporting documents 7 are then communicated to queue server 110 and stored in database 112 at step 730. If order 8 has been designated "Hold," it is placed on hold at step 734. If the order has not been designated "Hold," application server 120 performs a variety of verifications at steps 736–742.

At step 736, data sufficiency verification sub-module 128 verifies that an authorization image is associated with order data 6. If not, verification module 121 generates and sends an error message to queue server 110 at step 740. Queue server 110 will communicate the message to client 10 at the next log-in with an agent ID 256 matching agent ID 256 associated with order 8. If there is an authorization image associated with order data 6 at step 736, data sufficiency verification sub-module 128 undertakes further verifications to make sure that order data 6 is sufficient at step 738. If order data 6 is not sufficient at step 738, verification module 121 generates and sends an error message to queue server 110 at step 740. If order data 6 is sufficient at step 738, address verification sub-module 126 verifies the billing address for order 8 at step 742. If an invalid billing address is present at step 742, verification module 121 generates and sends an error message to queue server 110 at step 740. If a valid billing address is present at step 742, the order is ready for third party verification.

When third party verifier 80 wishes to perform an independent verification of order 8, third party verification sub-module 129 formats part of order 8 and communicates that part of order 8 to third party verifier 80 at step 744. At step 746, server 4 receives the verification. If order 8 is not valid at step 748, third party verification sub-module 129 generates an error message and sends it to queue server 110 at step 740. If order 8 is valid, then step 750 will set the third party verifier flag, or other indicator, in queue database 112, specifying order 8 as complete.

FIG. 15 is a detailed flow chart of step 800 in order entry process 500. Host server 150 systematically polls queue database 112 at step 802. Order retrieval module 152 determines whether any orders 8 are complete at step 804. If no orders are complete, order retrieval module 152 continues polling at step 802. However, if one or more orders 8 in queue database 112 are complete at step 804, order retrieval module 152 retrieves part or all of order 8 as complete order 142 at step 806 and stores complete order 142 in database 103 at step 807. Host server 150 then determines CSP 210 associated with BTN 254 for complete order 142 using BTN/CSP association module 154 and database 155 at step 808. Next, CSP formatting module 156, using the CSP care records in database 157, generates service request 172 using the proper format and information from complete order 142 at step 810. CSP communicator module 158 stores service request 172 in database 159 at step 812. CSP communicator module 158 communicates service request 172 to associated CSP 210 at step 814. Host server 150 then continues it standard polling operations at step 802.

Although the present invention has been described with several embodiments, a myriad of changes, variations, alterations, transformations, and modifications may be suggested to one skilled in the art, and is intended that the present invention encompass such changes, variations, alterations, transformations, and modifications as fall within the scope of the appended claims.

What is claimed is:

1. A system for processing an order to change communication service, comprising:

a client operable to receive order data and a document image associated with a customer that desires to change communication service; and a server coupled to the client using a communication network and operable to receive the order data and the document image from the client, the server further operable to generate a service request to change communication service using the order data and to initiate communication of the service request to a communication service provider of the customer to change communication service.

2. The system of claim 1, wherein the order data comprises:

a billing telephone number;

a billing address; and a communication service plan.

3. The system of claim 1, wherein the document image comprises a scanned authorization document to change communication service having a signature of the customer.

4. The system of claim 1, wherein the communication network comprises the Internet.

5. The system of claim 1, wherein:

the service request specifies a presubscribed interexchange carrier for the customer; and the communication service provider of the customer is a local exchange carrier.

6. The system of claim 1, wherein the server verifies a telephone number of the customer before the client communicates the order data and the document image to the server.

7. The system of claim 1, wherein the server verifies a billing telephone number against a billing address of the customer.

8. The system of claim 1, wherein the client receives updated software from the server.

9. The system of claim 1, wherein the server provides third party access to the order data or the document image to perform an independent verification of the order.

10. The system of claim 1, further comprising a gateway coupled to the server and operable to communicate the service request as an online transaction to a local exchange carrier servicing the customer.

11. A method for processing an order to change communication service, comprising:

receiving at a client order data and a document image associated with a customer that desires to change communication service;

communicating the order data and the document image to a remote location coupled to the client using a communication network;

generating a service request to change communication service using the order data; and initiating communication of the service request to a communication service provider of the customer to change communication service.

12. The method of claim 11, wherein the order data comprises:

a billing telephone number;

a billing address; and a communication service plan.

13. The method of claim 11, wherein the document image comprises a scanned authorization document to change communication service having a signature of the customer.

14. The method of claim 11, wherein the communication network comprises the Internet.

15. The method of claim 11, wherein:

the service request specifies a presubscribed interexchange carrier for the customer; and the communication service provider of the customer is a local exchange carrier.

16. The method of claim 11, wherein communicating the order data and the document image comprises:

communicating a telephone number to the remote location;

verifying the telephone number at the remote location; and communicating the order data and the document image to the remote location after verification of the telephone number.

17. The method of claim 11, further comprising verifying a billing telephone number against a billing address of the customer at the remote location.

18. The method of claim 11, further comprising receiving updated software at the client from the remote location.

19. The method of claim 11, further comprising the following steps performed before generating a service request:

providing third party access to the order data or the document image; and marking the order as verified upon successful completion of an independent verification by a third party.

20. The method of claim 11, further comprising:

receiving the service request at a gateway; and communicating the service request as an online transaction between the gateway and a local exchange carrier servicing the customer.

21. An apparatus for processing an order to change communication service, comprising:

a graphical interface operable to receive order data associated with a customer that desires to change communication service;

a scanner operable to generate a document image associated with the customer that desires to change communication service; and a network interface operable to communicate the order data and the document image to a remote location.

22. The apparatus of claim 21, wherein the document image comprises a scanned authorization document to change communication service having a signature of the customer.

23. The apparatus of claim 21, wherein the order data indicates a desire of the customer to change a presubscribed interexchange carrier.

24. The apparatus of claim 21, wherein the order data comprises:

a billing telephone number;

a billing address; and a communication service plan.

25. The apparatus of claim 21, wherein the graphical interface comprises:

an entry screen to receive a telephone number of the customer; and an accept button that, when activated, initiates verification of the telephone number at the remote location.

26. The apparatus of claim 21, wherein the graphical interface comprises:

an entry screen to receive a billing address of the customer; and a check button that, when activated, initiates verification of the billing address at the remote location.

27. The apparatus of claim 21, wherein the graphical interface comprises:

a first section operable to display a business rule list; and a second section operable to display an entry screen for a business rule selected from the business rule list.

28. The apparatus of claim 21, further comprising a memory operable to store software for the graphical interface, the memory further operable to store an updated version of the software received through the network interface.

29. The apparatus of claim 21, wherein the graphical interface comprises a status screen operable to display status information on a plurality of orders communicated to the remote location.

30. The apparatus of claim 21, wherein the graphical interface comprises a service plan selection screen to receive a selection of a service plan for the customer.

31. A method for processing an order to change communication service, comprising:

receiving order data using a graphical interface, the order data associated with a customer that desires to change communication service;

generating a document image associated with the customer that desires to change communication service; and communicating the order data and the document image to a remote location.

32. The method of claim 31, wherein the document image comprises a scanned authorization document to change communication service having a signature of the customer.

33. The method in claim 31, wherein the order data indicates a desire of the customer to change a presubscribed interexchange carrier.

34. The method of claim 31, wherein the order data comprises:

a billing telephone number;

a billing address; and a communication service plan.

35. The method of claim 31, further comprising:

communicating a telephone number included in the order data to the remote location for verification;

receiving verification of the telephone number; and communicating the order data and the document image to the remote location after receiving the verification.

36. The method of claim 31, further comprising:

communicating a billing telephone number and a billing address to the remote location for verification;

receiving verification of the billing telephone number and the billing address; and communicating the order data and the document image to the remote location after receiving the verification.

37. The method of claim 31, further comprising:

displaying a business rule list in a first section of the graphical interface;

receiving a selection of a business rule included in the business rule list; and displaying an entry screen for the selected business rule in the second section of the graphical interface.

38. The method of claim 31, further comprising:

communicating an agent identifier to the remote location; and receiving an update of software from the remote location after validation of the agent identifier.

39. The method of claim 31, further comprising:

communicating an agent identifier to the remote location; and receiving a list of orders associated with the agent identifier from the remote location.

40. An apparatus for processing an order to change communication service, comprising:

a memory to store an order to change communication service, the order comprising order data and a document image;

a verification module to verify a telephone number included in the order data; and a formatting module operable to generate a service request to change communication service using the order data.

41. The apparatus of claim 40, wherein the document image comprises a scanned authorization document to change communication service having a signature of the customer.

42. The apparatus of claim 40, wherein the order data further comprises:

a billing address; and a communication service plan.

43. The apparatus of claim 40, wherein the verification module is further operable to verify the telephone number against a billing address of the order.

44. The apparatus of claim 40, wherein the verification module performs the verification of the telephone number before the memory receives the order.

45. The apparatus of claim 40, further comprising an interface to communicate updated software to a remote client.

46. The apparatus of claim 40, further comprising an interface to communicate the order data or the imaged document stored in the memory to a third party to perform a verification of the order and to receive the verification from the third party.

47. The apparatus of claim 40, further comprising:

an association module operable to determine a local exchange carrier associated with the telephone number; and an interface to initiate communication of the service request to the associated local exchange carrier;

wherein the formatting module generates the service request for the associated local exchange carrier.

48. The apparatus of claim 40, further comprising:

an association module operable to determine a local exchange carrier associated with the telephone number; and a communicator module operable to initiate communication of the service request to the associated local exchange carrier as an online transaction;

wherein the formatting module generates the service request for the associated local exchange carrier based on a care record for the associated local exchange carrier.

49. A method for processing an order to change communication service, comprising:

storing an order to change communication service in a memory, the order comprising order data and a document image;

verifying a telephone number included in the order data; and generating a service request to change communication service using the order data.

50. The method of claim 49, wherein the document image comprises a scanned authorization document to change communication service having a signature of the customer.

51. The method of claim 49, wherein the order data further comprises:
a billing address; and
a communication service plan.

52. The method of claim 49, further comprising verifying the telephone number of the order against a billing address of the order.

53. The method of claim 49, wherein the telephone number in the order is verified before the order is stored.

54. The method of claim 49, further comprising communicating software stored in the memory over an interface to a remote client.

55. The method of claim 49, further comprising
communicating the order data or the document image to a third party to perform a verification of the order; and
receiving the verification from the third party.

56. The method of claim 49, further comprising:
determining a local exchange carrier associated with the telephone number; and
initiating communication of the service request to the associated local exchange carrier;
wherein generating a service request comprises generating a service request from the order for the associated local exchange carrier.

57. The method of claim 49, further comprising:
determining a local exchange carrier associated with the telephone number; and
initiating communication of the service request to the associated local exchange carrier as an online transaction;
wherein generating a service request comprises generating a service request from the order for the associated local exchange carrier based on a care record for the local exchange carrier.

58. An apparatus for processing an order to change communication service, comprising:
a graphical interface operable to receive order data associated with a customer that desires to change communication service, the graphical interface comprising:
an entry screen to receive a billing address of the customer; and
a check button that, when activated, initiates verification of the billing address at the remote location;
a scanner operable to generate a document image; and
a network interface operable to communicate the order data and the document image to a remote location.

59. The apparatus of claim 58, wherein the document image comprises a scanned authorization signature of the customer.

60. The apparatus of claim 58, wherein the order data indicates a desire of the customer to change a presubscribed interexchange carrier.

61. The apparatus of claim 58, wherein the order data comprises:
a billing telephone number;
the billing address; and
a communication service plan.

62. An apparatus for processing an order to change communication service, comprising:
a graphical interface operable to receive order data associated with a customer that desires to change communication service, the graphical interface comprising:
a first section operable to display a business rule list; and
a second section operable to display an entry screen for a business rule selected from the business rule list;
a scanner operable to generate a document image; and
a network interface operable to communicate the order data and the document image to a remote location.

63. The apparatus of claim 62, wherein the document image comprises a scanned authorization signature of the customer.

64. The apparatus of claim 62, wherein the order data indicates a desire of the customer to change a presubscribed interexchange carrier.

65. The apparatus of claim 62, wherein the order data comprises:
a billing telephone number;
a billing address; and
a communication service plan.

66. An apparatus for processing an order to change communication service, comprising:
a graphical interface operable to receive order data associated with a customer that desires to change communication service, the graphical interface comprising a service plan selection screen to receive a selection of a communication service plan for the customer;
a scanner operable to generate a document image; and
a network interface operable to communicate the order data and the document image to a remote location.

67. The apparatus of claim 66, wherein the document image comprises a scanned authorization signature of the customer.

68. The apparatus of claim 66, wherein the order data indicates a desire of the customer to change a presubscribed interexchange carrier.

69. The apparatus of claim 66, wherein the order data comprises:
a billing telephone number;
a billing address; and
the communication service plan.

70. A method for processing an order to change communication service, comprising:
receiving order data using a graphical interface, the order data associated with a customer that desires to change communication service, wherein receiving order data comprises:
displaying a business rule list in a first section of the graphical interface;
receiving a selection of a business rule included in the business rule list; and
displaying an entry screen for the selected business rule in the second section of the graphical interface;
generating a document image associated with the customer; and
communicating the order data and the document image to a remote location.

71. The method of claim 70, wherein the document image comprises a scanned authorization signature of the customer.

72. The method of claim 70, wherein the order data indicates a desire of the customer to change a presubscribed interexchange carrier.

73. The method of claim 70, wherein the order data comprises:
a billing telephone number;
a billing address; and
a communication service plan.

74. A method for processing an order to change communication service, comprising:

communicating an agent identifier to the remote location;

receiving an update of software from the remote location after validation of the agent identifier;

receiving order data using a graphical interface, the order data associated with a customer that desires to change communication service;

generating a document image associated with the customer; and communicating the order data and the document image to a remote location.

75. The method of claim 74, wherein the document image comprises a scanned authorization signature of the customer.

76. The method of claim 74, wherein the order data indicates a desire of the customer to change a presubscribed interexchange carrier.

77. The method of claim 74, wherein the order data comprises:

a billing telephone number;

a billing address; and a communication service plan.

78. A method for processing an order to change communication service, comprising:

communicating an agent identifier to the remote location;

receiving a list of orders associated with the agent identifier from the remote location;

receiving order data using a graphical interface, the order data associated with a customer that desires to change communication service;

generating a document image associated with the customer; and communicating the order data and the document image to a remote location.

79. The method of claim 78, wherein the document image comprises a scanned authorization signature of the customer.

80. The method of claim 78, wherein the order data indicates a desire of the customer to change a presubscribed interexchange carrier.

81. The method of claim 78, wherein the order data comprises:

a billing telephone number;

a billing address; and a communication service plan.

82. An apparatus for processing an order to change communication service, comprising:

a memory to store an order to change communication service, the order comprising order data and a document image; and a verification module to verify a telephone number included in the order data, wherein the verification module performs the verification of the telephone number before the memory receives the order.

83. The apparatus of claim 82, wherein the document image comprises a scanned authorization signature of the customer.

84. The apparatus of claim 82, wherein the order data further comprises:

a billing address; and a communication service plan.

85. The apparatus of claim 82, wherein the verification module verifies the telephone number against a billing address of the order to verify the telephone number.

86. The apparatus of claim 82, further comprising:

an association module operable to determine a local exchange carrier associated with the telephone number;

a formatting module operable to generate a service request from the order for the associated local exchange carrier; and an interface to initiate communication of the service request to the associated local exchange carrier.

87. An apparatus for processing an order to change communication service, comprising:

a memory to store an order to change communication service, the order comprising order data and a document image;

a verification module to verify a telephone number included in the order data;

an association module operable to determine a local exchange carrier associated with the telephone number;

a formatting module operable to generate a service request from the order for the associated local exchange carrier; and an interface to initiate communication of the service request to the associated local exchange carrier.

88. The apparatus of claim 87, wherein the document image comprises a scanned authorization signature of the customer.

89. The apparatus of claim 87, wherein the order data further comprises:

a billing address; and a communication service plan.

90. The apparatus of claim 87, wherein the verification module is further operable to verify the telephone number against a billing address of the order.

91. An apparatus for processing an order to change communication service, comprising:

a memory to store an order to change communication service, the order comprising order data and a document image;

a verification module to verify a telephone number included in the order data;

an association module operable to determine a local exchange carrier associated with the telephone number of the order;

a formatting module operable to generate a service request from the order for the associated local exchange carrier based on a care record for the associated local exchange carrier; and a communicator module operable to initiate communication of the service request to the associated local exchange carrier as an online transaction.

92. The apparatus of claim 91, wherein the document image comprises a scanned authorization signature of the customer.

93. The apparatus of claim 91, wherein the order data further comprises:

a billing address; and a communication service plan.

94. The apparatus of claim 91, wherein the verification module is further operable to verify the telephone number against a billing address of the order.

95. A method for processing an order to change communication service, comprising:

storing an order to change communication service in a memory, the order comprising order data and a document image; and verifying a telephone number included in the order data, wherein the telephone number in the order is verified before the order is stored.

96. The method of claim 95, wherein the document image comprises a scanned authorization signature of the customer.

97. The method of claim 95, wherein the order data further comprises:

a billing address; and a communication service plan.

98. The method of claim 95, wherein verifying the telephone number comprises verifying the telephone number of the order against a billing address of the order.

99. The method of claim 95, further comprising:

determining a local exchange carrier associated with the telephone number;

generating a service request from the order for the associated local exchange carrier; and initiating communication of the service request to the associated local exchange carrier.

100. A method for processing an order to change communication service, comprising:

storing an order to change communication service in a memory, the order comprising order data and a document image;

verifying a telephone number included in the order data;

determining a local exchange carrier associated with the telephone number;

generating a service request from the order for the associated local exchange carrier; and initiating communication of the service request to the associated local exchange carrier.

101. The method of claim 100, wherein the document image comprises a scanned authorization signature of the customer.

102. The method of claim 100, wherein the order data further comprises:

a billing address; and a communication service plan.

103. The method of claim 100, wherein verifying the telephone number comprises verifying the telephone number of the order against a billing address of the order.

104. A method for processing an order to change communication service, comprising:

storing an order to change communication service in a memory, the order comprising order data and a document image;

verifying a telephone number included in the order data;

determining a local exchange carrier associated with the telephone number;

generating a service request from the order for the associated local exchange carrier based on a care record for the local exchange carrier; and initiating communication of the service request to the associated local exchange carrier as an online transaction.

105. The method of claim 104, wherein the document image comprises a scanned authorization signature of the customer.

106. The method of claim 104, wherein the order data further comprises:

a billing address; and a communication service plan.

107. The method of claim 104, wherein verifying the telephone number comprises verifying the telephone number of the order against a billing address of the order.

* * * * *